United States Patent [19]

Kitterman et al.

[11] 3,813,525

[45] May 28, 1974

[54] COUNTER AND PRESET UNIT

[75] Inventors: Richard E. Kitterman; Grady E. Giles, both of Greenville, S.C.

[73] Assignee: Hersey Products, Inc., Spartanburg, S.C.

[22] Filed: May 30, 1972

[21] Appl. No.: 257,533

[52] U.S. Cl. ....... 235/92 PE, 235/92 R, 235/92 CA

[51] Int. Cl. .......... G06m 3/02

[58] Field of Search .......... 235/92 CA, 92 PE

[56] References Cited

UNITED STATES PATENTS

| | | | |
|---|---|---|---|
| 2,928,033 | 3/1960 | Abbott | 235/92 CA |
| 3,272,970 | 9/1966 | Laycak | 235/92 PE |
| 3,323,527 | 6/1967 | Wo | 235/92 CN |
| 3,441,719 | 4/1969 | Haller | 235/92 PE |
| 3,490,017 | 1/1970 | Kolell | 235/92 CA |
| 3,580,421 | 5/1971 | Bickford | 235/92 FL |

*Primary Examiner*—Paul J. Henon
*Assistant Examiner*—Robert F. Gnuse
*Attorney, Agent, or Firm*—B. P. Fishburne, Jr.

[57] ABSTRACT

A counting system including a solid state counter and preset unit which counts an input pulse signal and compares it in a logic gating circuit with a preset number, a display device which permits the displaying of either the preset number or the incoming count and interlocking means to prevent accidental disruption of a count sequence.

6 Claims, 2 Drawing Figures

COUNTER AND PRESET UNIT

BACKGROUND OF THE INVENTION

The present invention relates to a counting system and more particularly to a solid state counter which compares a monitored signal with a preset input.

Prior art predetermining counters of the self-contained type generally available on the market today which compare a monitored signal with a preset number use some form of electromechanical devices such as rotary switches, push button stepping switches or thumb wheel switches to preset and store the preset number into the comparator.

SUMMARY OF THE INVENTION

The present invention is a counter and preset unit using only solid state circuits to perform a counting and comparing operation. A preset number is applied to the system through a suitable counter and logic gating circuit. An input pulse signal which is being monitored is counted by a second set of counters and compared in the gating circuit. When a comparison is made, a control signal is formed and passed to a utilization device. A feature of the system includes a display device which may be used for displaying the preset number or the incoming count number. The system is further provided with an interlocking system whereby accidental pushing of buttons will not disturb the preset number until the count is complete or put into the stop mode.

An object of the present invention is to provide a counter and preset system which includes no electromechanical devices, thus avoiding the unreliability of such devices. Another object is to provide a counter and preset system wherein all active components are solid state components. A further object is to provide a system of the mentioned type wherein the switches are completely isolated from the solid state circuitry during all periods of operation of the counter, thereby preventing error. Still another object is to provide a system of the above type having a single light numeric display means used for displaying a preset number or for displaying a monitored count.

Other objects and advantages of the invention will become apparent during the course of the following detailed description.

DETAILED DESCRIPTION OF THE PREFERRED EMBODIMENT

Figure 1A:
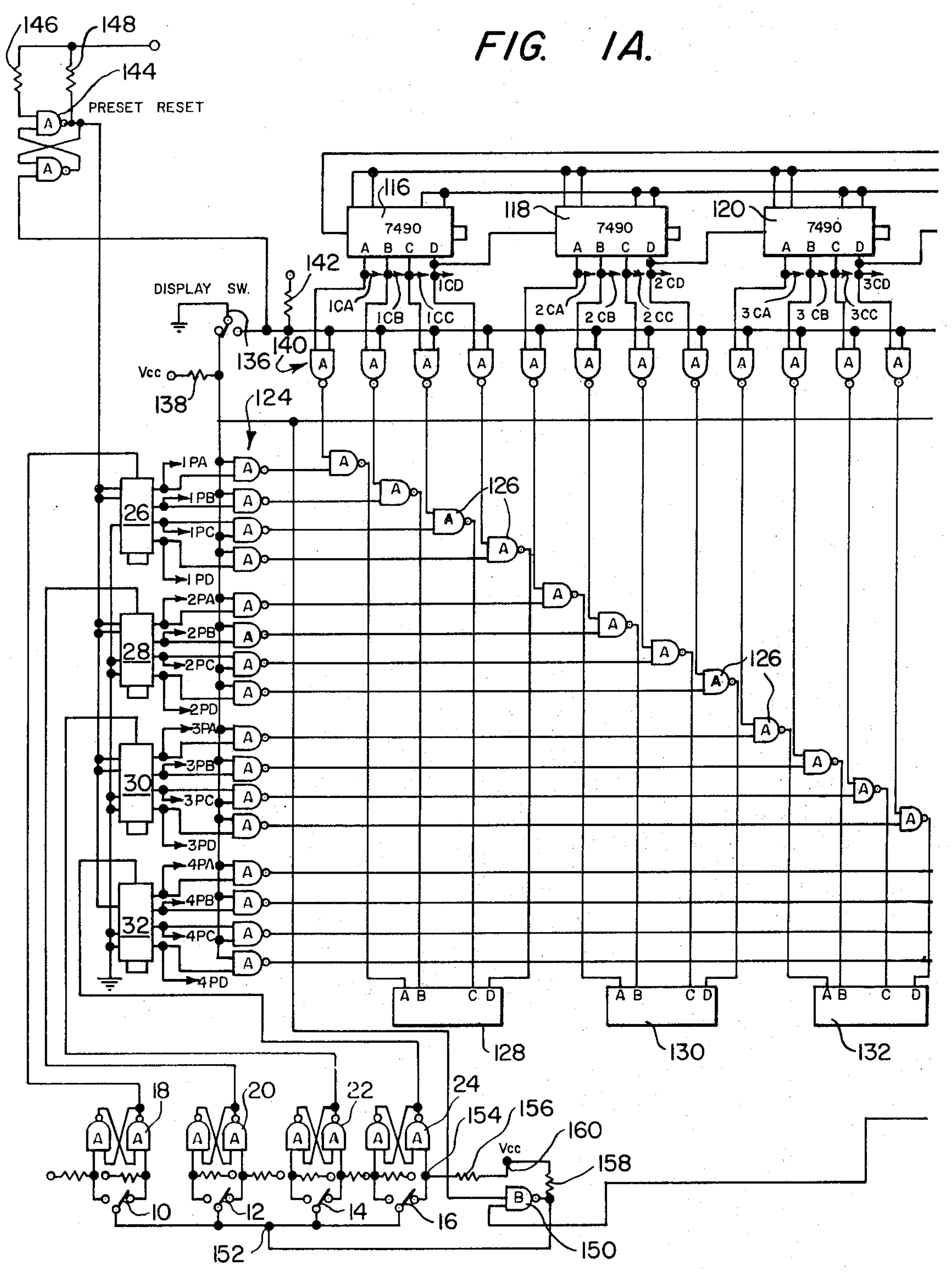
FIGS. 1A and 1B are a block diagram of the counter and preset unit of the present invention.
Figure 1B:
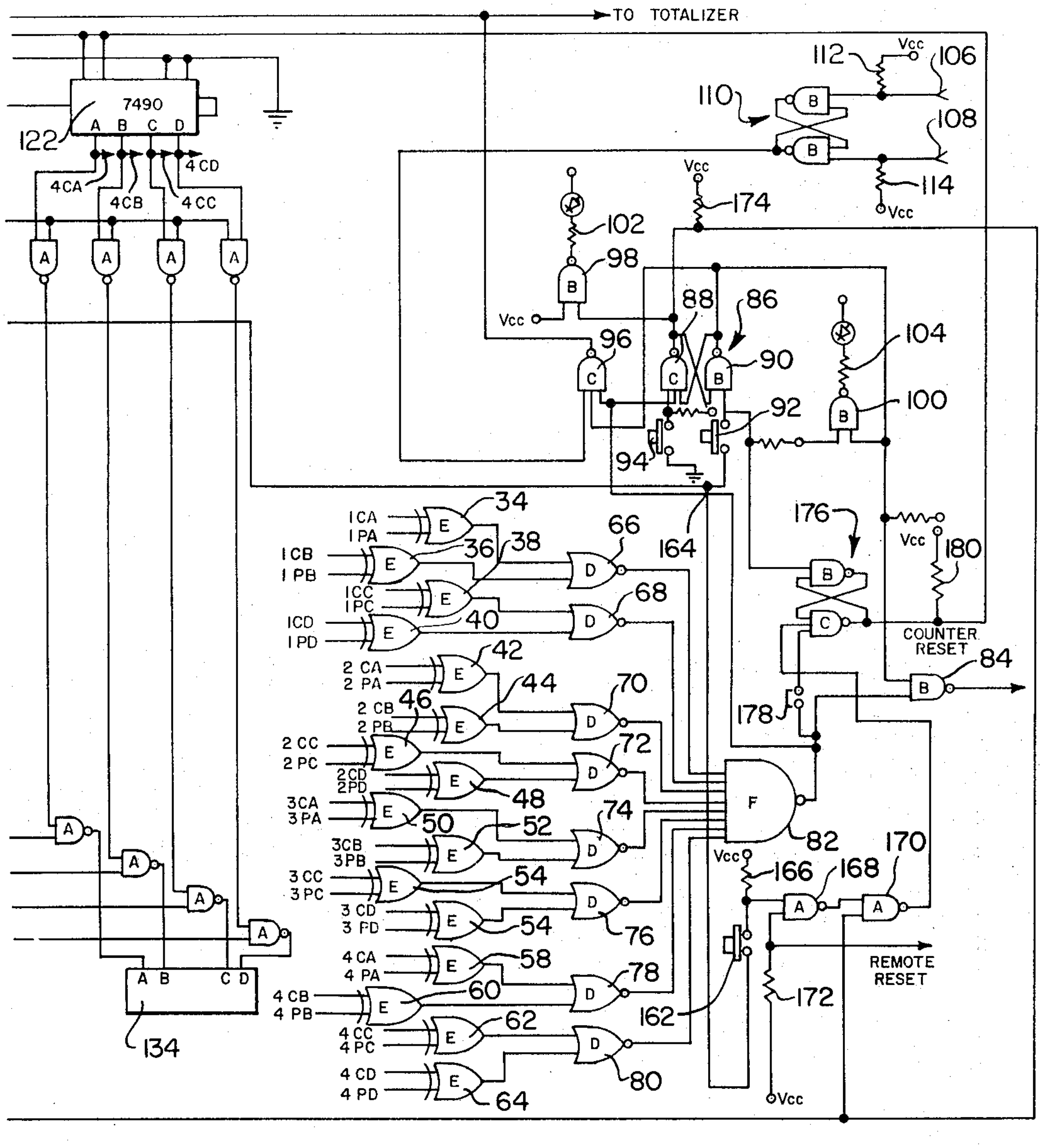

The schematic of the counter preset unit is illustrated in FIGS. 1A and 1B. The designation Vcc indicates the presence of an input positive potential at that particular point. Four momentary contact switches 10, 12, 14 and 16 are connected across the inputs of monostable flip-flops 18, 20, 22 and 24, the outputs of which are connected to the respective input terminals of four decade counters 26, 28, 30 and 32. Each of the decade counters 26, 28, 30 and 32 has four output lines which provide a binary coded decimal (BCD) arrangement whereby each output is a "1" or "0" in accordance with normal BCD representation, the exact arrangement being dependent upon the number inputed into the decade counter. The outputs of the decade counters 26, 28, 30 and 32 are coupled to a series of exclusive OR gates evenly numbered 34 to 64, as shown. The output lines of the decade counters and the inputs of the OR gates 34 – 64 are provided with corresponding designations. For example, the first output of decade counter 26 is designated 1PA and correspondingly one of the inputs of OR gate 34 is marked 1PA. Likewise, the last output of decade counter 32 is marked 4PD and correspondingly OR gate 64 is marked 4PD.

Pairs of the outputs of OR gates 34 – 64 are combined in a series of OR gates numbered evenly 66 through 80, the outputs of which in turn are connected to NAND gate 82. The output of gate 82 is connected to output NAND gate 84, which normally controls the output signal.

The start and stop arrangement is made up of a flip-flop device 86 including NAND gate device 88 and NAND gate device 90, a start switch 92 and a stop switch 94. The output of flip-flop 86 is coupled to NAND gate 96 and to output gate 84. NAND gate devices 98 and 100 and their associated resistors 102 and 104 are light-emitting diode pilot light drivers.

The input from the signal being counted is taken from input terminals 106 and 108 which feeds a flip-flop 110. The output of gate 96 representing the signal being counted is fed to the input of four decade counters 116, 118, 120 and 122. The outputs of the decade counters 116, 118, 120 and 122 are connected to the exclusive OR gates 34 – 64 where they are compared. For example, the first output 1CA of counter 116 is applied to the input of gate 34 while the last output of counter 122 is connected to gate 64. The outputs of decade counters 116, 118, 120 and 122 are in BCD form and are represented by a "0" or "1" on the output line.

The binary outputs of decade counters 26, 28, 30 and 32 are also connected to a series of NAND gates 124, one each for each BCD output of each counter. These gates 124 are in turn connected to a succeeding series of gates 126 which are then connected to four light-emitting diode numerical displays 128, 130, 132 and 134 which display the count of the preset number. The four BCD digit outputs are decoded and converted into a usable numerical signal which is shown on the display. The gates 124 are enabled through grounded display switch 136.

The BCD outputs of decade counters 116, 118, 120 and 122 are also connected to a series of NAND gates 140 which in turn are connected to the series of gates 126 and displays 128, 130, 132 and 134. A second position on display switch 136 connects the gates 140 to ground in order to provide an indication of the incoming count.

A preset reset flip-flop 144 is connected to the gate circuit 140 and the display switch 136. The flip-flop is also connected to the decade counters 26, 28, 30 and 32.

One input of a gate 150 is connected to ground through the display switch 136. The second input of gate 150 is connected to start-stop flip-flop arrangement 86.

The output of gate 150 is connected to the preset input switches 18, 20, 22 and 24 at junctions 152 and 154 through resistors 156 and 158. A reset switch 162 is connected to ground at the display switch 136 by way of junction 164. The other side of reset switch 162 is connected to the power supply through a resistor 166.

The reset switch 162 forms one input to NAND gate 168 which in turn inputs a second NAND gate 170. A second input to gate 168 is enabled by the stop switch 94.

A second input to gate 170 is connected to the power input at the start-stop arrangement through resistor 174. The output of gate 170 is coupled to flip-flop 176. A second input to flip-flop 176 is coupled to the start switch 92. The output of the flip-flop 176 is coupled to the counters 116, 118, 120 and 122. An automatic reset jumper 178 is coupled between an input of flip-flop 176 and the output of the gate 82.

The operation of the system may be described as follows. With the power on, a preset number is inserted into the system by depressing the display switch and the appropriate ones of the four momentary contact switches 18, 20, 22 and 24. As each of these switches is depressed, it will insert a "0" level at the input of the associated decade counter 26, 28, 30 or 32, and the counter will increase the count each time the switch is depressed. Once the numbers have been inserted into the counters, this information is sent from the output of the counters to the respective inputs of the exclusive OR gates 34 – 64. The data appearing at the input of the OR gates is in the form of "1" and "0" corresponding to the BCD number of the output of the counters 26, 28, 30 and 32. Once this data has been put into the exclusive OR gates, the system is ready to operate.

Depressing start switch 92 activates flip-flop 86 which connects to one input of gate 96. Incoming pulses are supplied from terminals 106 and 108 through flip-flop 110 to a second input on gate 96, thereby enabling it. Pulse signals are fed to the input of counter 116 which starts counting the pulses. When counter 116 reaches its limit, the signals are transmitted sequentially to the remaining counters. The outputs of counters 116, 118, 120 and 122 also go into the exclusive OR gates 34 – 64 and are compared with the output from the preset counters 26, 28, 30 and 32. When the comparison has been made of the input count versus the preset number count set by momentary contact switches 10, 12, 14 and 16, the outputs of the exclusive OR gates, which are BCD "1"s, go into gate 82. When all of the inputs to gate 82 have become "1"s, a "0" will appear at the output of gate 82 which is applied to gate 84. This provides a "1" count to the system output which may be used to control the "on" and "off" of an A.C. signal.

Either the preset input or the pulse count being monitored at a particular time may be displayed on light displays 128, 130, 132 and 134. With display switch 136 in the position shown, a signal is provided to one input of the series of gates 124. A second input to these gates is taken directly from the BCD outputs of counters 26, 28, 30 and 32. The output of gates 124 is coupled to the series of gates 126 which provide BCD information to displays 128, 130, 132 and 134. These displays may take the four BCD digit output of the counters and convert it into a numerical display or, by means of multiplexing and by moving the display switch 136 to the opposite direction, gate series 140 is enabled and the BCD output from counters 116, 118, 120 and 122 is displayed.

The interlock schemes of the counter and preset unit operate in the following manner. When power is first applied, flip-flop 176 is energized and returns a reset signal to counters 116, 118, 120 and 122. This clears the counters and provides a "0" output therefrom. Simultaneously, the preset-reset flip-flop 144 is set to a "0" count when power is first applied due to resistor 146 at the input to reset-preset counters 26, 28, 30 and 32.

The start and stop flip-flop arrangement 86 is for starting and stopping the input count and the operation of the counter and preset unit. When a number has been inserted into the preset unit by means of switches 10, 12, 14, 16 and 136, and the system is ready to count, start button 92 is actuated. This momentarily grounds the input of device 90. The output of device 90 will be at a "1" which will enable the gate 96. The output of gate 96 goes into the input of counters 116, 118, 120 and 122. The output of gate 96 goes to a "0" which produces a count at the input of counter 116. The interlocking schemes are now operative.

Referring again to preset switches 10, 12, 14 and 16, these switches pick up their grounds through the gate 150. When the system is in the start mode and counting, gate 150 is disabled by means of a signal at the output of device 88. Therefore, with the system in a start mode and counting, it is impossible to change the number in the preset unit composed of switches 10, 12, 14 and 16, and the solid state counting and comparison system is effectively isolated from all electromechanical switches. Thus, accidental changing of the preset number, while the solid state system is in operation, is precluded.

Another feature preventing accidental changing of the preset number resides in the display switch 136. This switch must be in the alternate position, not shown in the drawings, namely the position which enables the output of the monitored count to be shown on the displays 128, 130, 132 and 134. The display switch 136, when in the opposite position to that shown in the drawings, will reset flip-flop 144 which will have an output of "0" going to the reset line of counters 26, 28, 30 and 32. This will allow a preset number to be put into these devices. The switch 136 must, however, be thrown to the opposite position to display the preset number before a preset number can be inserted by switches 10, 12, 14 and 16.

A further lock-out scheme for the system resides in the reset switch 162. With the counter and preset unit in a start mode and counting, the reset button or switch 162 is inactive due to the level of the device 88 above the stop switch 94. With the system in the start mode, device 88 is setting at a "0" and the output of the device is setting at a "0" and this output is coupled to gate 170. The device 88 will now be disabled and this will prevent activation of the reset switch 162 with the system in a start mode. In order to activate the reset switch, the stop button 94 must first be depressed. This will enable the device 88 and will also enable reset switch 162. This important feature prevents accidental activation of the reset switch and destruction of the input count while the system is in the start mode.

The flip-flop arrangement 176 receives an output when automatic reset jumper 178 is inserted from the gate 82 at the end of the count. When a comparison has been made between the preset unit counters 26, 28, 30 and 32 and the input count of counters 116, 118, 120 and 122, a "0" is received at the output of these latter counters. A "0" is then received at the output of gate 82. This "0" will automatically reset the input counters 116, 118, 120 and 122 and the output from gate 82 will go to the input of device 88. This "0" signal will automatically stop the incoming count and automatically reset the input counters. There appears to be no reason to automatically reset the preset number and therefore no automatic reset to a "1" count is provided for.

The automatic lock-out system or isolating means for fail-safe operation to prevent the accidental activation of switches may be summarized as follows. No number can be preset into the preset counters 26, 28, 30 and 32 unless the system is in the stop mode and the display switch 136 has been moved to the opposite position from that shown in the drawings. The insertion of a number into the input counters 116, 118, 120 and 122 permits actuation of the display units 128, 130, 132 and 134 to display that number. No reset can be applied while the unit is in the start mode because, if the display switch 136 is thrown and preset switches 10, 12, 14 and 16 are actuated, they will be ineffective because of the interlocking scheme associated with the gate 150. When a comparison of numbers occurs, the input count is automatically stopped and changes the state of gate 84 at the output of the system.

Once the start mode is established and the system is running, the only switches that can be used are the display switch 136, which will only enable the preset or the actual count number to be displayed, or the stop switch. If the stop switch is used, the input count is interrupted and the output of the system is placed in the stop mode.

It is to be understood that the form of the invention herewith shown and described is to be taken as a preferred example of the same, and that various changes in the shape, size and arrangement of parts may be resorted to, without departing from the spirit of the invention or scope of the subjoined claims.

I claim:

1. A solid state preset counter circuit comprising means for inserting a preset count into said circuit, incoming signal counter means, comparator circuit means for comparing the preset count and incoming signal count, output circuit means for producing a utilization signal when a comparison is made, isolation means for isolating and preventing operation of said preset counter circuit when said incoming signal counter means is counting, display means for selectively providing a visual display of either the preset count or incoming signal count, and display switching means for switching said display means between said preset count and incoming signal count circuits, said means for inserting a preset count further comprising a preset count circuit having a preset count switch means, preset counter means, reset means and gating means adapted to be enabled by a signal from said comparator upon the completion of a count sequence, whereby actuation of said reset means by said display switching means and enabling of said gating means completes said preset count circuit to permit setting of a preset count in said preset counter.

2. The counter of claim 1 further including a stop switch adapted to enable said gating means upon actuation.

3. A counting system for comparing a preset count with a monitored count comprising input switch means for inserting a preset count into the system, first counter means to receive said preset count, second counter means for counting input signals from a monitored device, comparator circuit means for comparing said preset count with said monitored count, means coupled to said comparator means to provide a utilization signal when a comparison is made between said preset and monitored counts, count display means including means for selectively displaying either said preset or monitored counts and means for preventing accidental interruption of an initiated counting sequence including means for isolating said counter circuits from said input means and means for interlocking said counters until a comparison is made, said interlocking means including a first reset means providing a reset signal to said second counter and a second reset means providing a reset signal to said first counter.

4. The counting system of claim 3 wherein said interlocking means further comprises a start circuit which provides an enabling pulse to permit said first and second counters to begin a counting sequence.

5. The counting system of claim 4 wherein said interlocking means includes means for disabling said first counter during the start or counting mode to prevent a change in the preset count input, said disabling means further including a gating means and said display switch means, when said display switch means is in the monitored count display position.

6. The counting system of claim 5 wherein said interlocking means including a stop circuit and a reset switch wherein said stop circuit must be enabled in order to complete the circuit to said reset switch to enable said reset switch to its operative position.

* * * * *